US010890762B2

(12) United States Patent
Kusanagi et al.

(10) Patent No.: US 10,890,762 B2
(45) Date of Patent: Jan. 12, 2021

(54) IMAGE DISPLAY APPARATUS AND IMAGE DISPLAY METHOD

(71) Applicant: Ricoh Company, Ltd., Tokyo (JP)

(72) Inventors: Masato Kusanagi, Kanagawa (JP); Kenichiroh Saisho, Tokyo (JP); Hiroshi Yamaguchi, Kanagawa (JP); Yuuki Suzuki, Kanagawa (JP); Keita Katagiri, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 273 days.

(21) Appl. No.: 16/046,470

(22) Filed: Jul. 26, 2018

(65) Prior Publication Data
US 2018/0373030 A1 Dec. 27, 2018

Related U.S. Application Data

(63) Continuation of application No. PCT/JP2017/000997, filed on Jan. 13, 2017.

(30) Foreign Application Priority Data

Feb. 8, 2016 (JP) .................................. 2016-021737

(51) Int. Cl.
G02B 27/01 (2006.01)
B60K 35/00 (2006.01)
(Continued)

(52) U.S. Cl.
CPC .......... G02B 27/0101 (2013.01); B60K 35/00 (2013.01); B60R 11/02 (2013.01);
(Continued)

(58) Field of Classification Search
CPC ........ G02B 27/0101; G02B 2027/0138; G02B 2027/014
See application file for complete search history.

(56) References Cited

U.S. PATENT DOCUMENTS 7,616,364 B2   11/2009  Saisho et al.
7,672,032 B2    3/2010  Hayashi et al.
(Continued)

FOREIGN PATENT DOCUMENTS

EP    2944986    11/2015
EP    2945000    11/2015
(Continued)

OTHER PUBLICATIONS

Extended European Search Report dated Jan. 18. 2019 in corresponding European Patent Application No. 17750022.0, 8 pages.
(Continued)

Primary Examiner — Joseph P Martinez
(74) Attorney, Agent, or Firm — Xsensus LLP

(57) ABSTRACT

An image display apparatus includes an optical system to display an image; a first camera to take a picture of an object at the same position as or near a position of the image; a second camera to take a picture of a head of a viewer; and at least one processor to analyze the picture of the head of the viewer taken by the second camera to detect a position of a visual point of the viewer, wherein the at least one processor controls the image in response to determining overlap of the object with the image when viewed from the position of the visual point of the viewer.

9 Claims, 10 Drawing Sheets

(51) Int. Cl.
    *B60R 11/02*         (2006.01)
    *H04N 7/18*         (2006.01)
    *G09G 5/00*         (2006.01)
    *G01C 21/36*        (2006.01)
    *B60R 11/04*        (2006.01)
    *G06F 3/01*          (2006.01)
    *G06K 9/00*         (2006.01)

(52) U.S. Cl.
    CPC ............ *B60R 11/04* (2013.01); *G01C 21/365* (2013.01); *G06F 3/012* (2013.01); *G06K 9/00221* (2013.01); *G09G 5/00* (2013.01); *H04N 7/18* (2013.01); *B60K 2370/334* (2019.05); *G02B 2027/014* (2013.01); *G02B 2027/0138* (2013.01)

(56) References Cited

U.S. PATENT DOCUMENTS

| | | | |
|---|---|---|---|
| 7,688,491 B2 | 3/2010 | Saisho et al. | |
| 7,817,177 B2 | 10/2010 | Hayashi et al. | |
| 7,876,486 B2 | 1/2011 | Saisho et al. | |
| 8,045,248 B2 | 10/2011 | Watanabe et al. | |
| 8,059,149 B2 | 11/2011 | Saisho et al. | |
| 8,213,067 B2 | 7/2012 | Saisho | |
| 8,368,736 B2 | 2/2013 | Saisho et al. | |
| 8,531,766 B2 | 9/2013 | Tokita et al. | |
| 8,559,053 B2 | 10/2013 | Saisho et al. | |
| 8,848,013 B2 | 9/2014 | Saisho et al. | |
| 8,876,294 B2 | 11/2014 | Saisho et al. | |
| 8,884,975 B2 | 11/2014 | Satoh et al. | |
| 9,158,124 B2 | 10/2015 | Saisho et al. | |
| RE45,918 E | 3/2016 | Saisho et al. | |
| 9,686,480 B2 | 6/2017 | Kusanagi | |
| 9,798,140 B2 | 10/2017 | Inamoto et al. | |
| 2016/0170487 A1 | 6/2016 | Saisho | |
| 2016/0313562 A1 | 10/2016 | Saisho et al. | |
| 2016/0327402 A1 | 11/2016 | Funabiki et al. | |
| 2016/0334637 A1 | 11/2016 | Saisho et al. | |

FOREIGN PATENT DOCUMENTS

| | | | | |
|---|---|---|---|---|
| JP | 2009-274542 | 11/2009 | | |
| JP | 4692595 | 3/2011 | | |
| JP | 2012-252347 | 12/2012 | | |
| JP | 2013-203374 | 10/2013 | | |
| JP | 2013-257574 | 12/2013 | | |
| JP | 2014-115670 | 6/2014 | | |
| JP | 2014-139655 | 7/2014 | | |
| JP | 2014-139656 | 7/2014 | | |
| JP | 2014-139657 | 7/2014 | | |
| JP | 2014-181927 | 9/2014 | | |
| JP | 2014-185926 | 10/2014 | | |
| JP | 2015-049266 | 3/2015 | | |
| JP | 2015-108838 | 6/2015 | | |
| JP | 2015-134521 | * | 7/2015 | ............ B60K 35/00 |
| JP | 2015-134521 A | 7/2015 | | |
| JP | 2015-138084 | 7/2015 | | |
| JP | 2015-148664 | 8/2015 | | |
| JP | 2015-232691 | 12/2015 | | |
| JP | 2015-232692 | 12/2015 | | |
| JP | 2015-232693 | 12/2015 | | |
| JP | 2016-107945 | 6/2016 | | |
| WO | WO 2015/118859 A1 | 8/2015 | | |

OTHER PUBLICATIONS

International Search Report dated Apr. 4, 2017 in PCT/JP2017/000997 filed on Jan. 13, 2017.

* cited by examiner

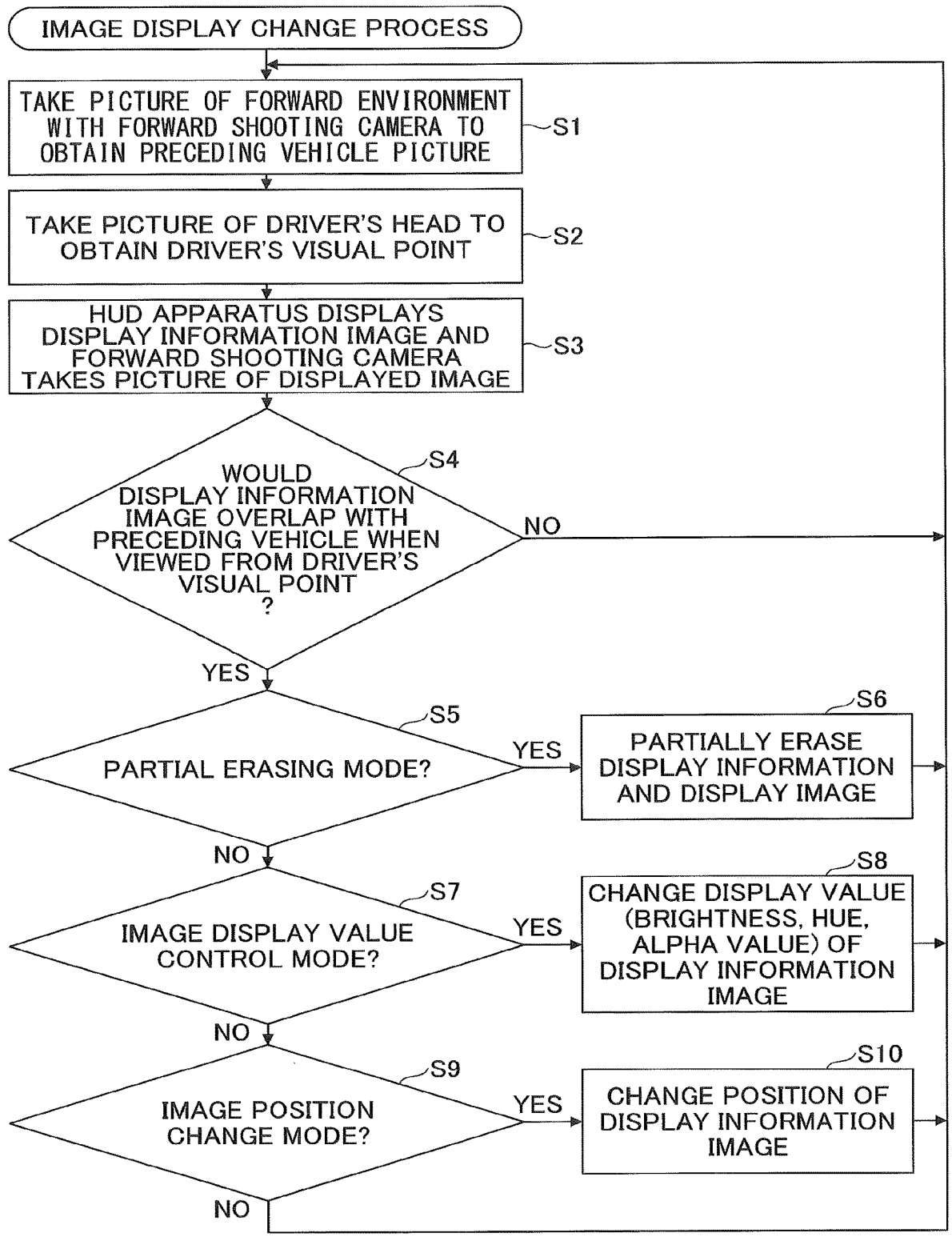

IMAGE DISPLAY APPARATUS AND IMAGE DISPLAY METHOD

CROSS-REFERENCE TO RELATED APPLICATIONS

The present patent application is a continuation application of International Application No. PCT/JP2017/000997, filed Jan. 13, 2017, which claims priority to Japanese Patent Application No. 2016-021737, filed Feb. 8, 2016. The contents of these applications are incorporated herein by reference in their entirety.

FIELD OF THE INVENTION

The present invention relates to an image display apparatus and an image display method.

BACKGROUND ART

Technical development for a head-up display (hereinafter, referred to as a HUD) to be installed in a vehicle has been progressing. Expectations for a HUD have increased in the market, as an apparatus for a vehicle's driver to be able to recognize an alarm and information with a small amount of line-of-sight movement. In particular, along with advancement of automotive sensing technology typified by an ADAS (Advanced Driving Assistance System), a vehicle has been able to acquire various types of traveling environment information and vehicle occupant information. A HUD to be installed in a vehicle has also drawn attention as an "outlet of ADAS" that transmits the various types of traveling environment information and vehicle occupant information to the driver.

A HUD to be installed in a vehicle displays an image as a virtual image ahead of the driver's visual point position by several meters. Thus, the HUD to be installed in the vehicle is capable of displaying the image as if the image were located in a real space in front of the vehicle. Such technology with which an image appears as if the image were present in a real space is called AR (Augmented Reality), and it is considered that the technology enables various types of information to be intuitionally displayed to the driver.

RELATED ART DOCUMENT

Patent Document

Patent Document No. 1: Japanese Patent No. 4692595

SUMMARY

In one aspect of the present invention, an image display apparatus includes a display section configured to display an image; a detecting section configured to detect an object at the same position as or near a position of the image; and a control section configured to control the image in response to determining overlap of the object with the image when viewed from a position of a visual point of a viewer viewing the image.

BRIEF DESCRIPTION OF THE DRAWINGS

FIG. 7 is a flowchart illustrating one example of an image display change process implemented by the control system 250 of FIG. 4.

DESCRIPTION OF EMBODIMENTS

An object of the embodiment of the present invention is to improve a viewer's visibility for a case where, if an image displayed by an image display apparatus and an object at the same position as or near a position of the image were viewed from a position of the viewer's visual point, the image would overlap with the object.

In the embodiment of the present invention now being described in detail, it is possible to improve a viewer's visibility for a case where, if an image displayed by an image display apparatus and an object at the same position as or near a position of the image were viewed from a position of the viewer's visual point, the image would overlap with the object.

The embodiment of the present invention now being described improves a viewer's visibility for a case where, for example, there is an object such as another vehicle in front of a vehicle, and, if an image displayed by a HUD 200 and the object are viewed from a viewer, the image is superposed on the object.

Hereinafter, the embodiment of the present invention will be described with reference to the drawings.

Figure 1:
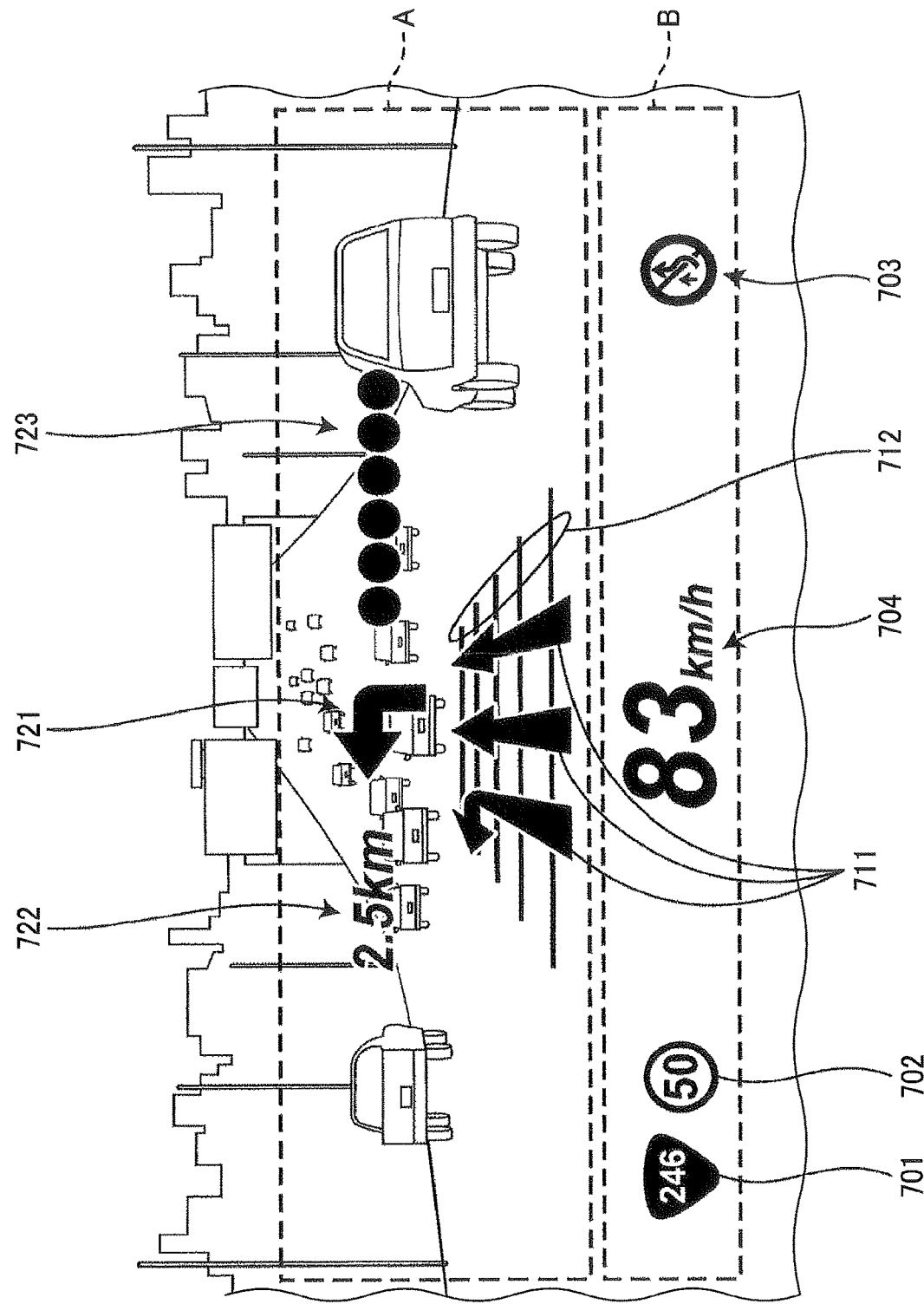
FIG. 1 is a front view illustrating one example of a virtual image displayed by an automotive HUD 200 (hereinafter, simply referred to as a HUD 200) according to an embodiment of the present invention in a state where the virtual image is superposed on a landscape, which a driver can see through a windshield 302, in front of a vehicle 301.
Figure 2:
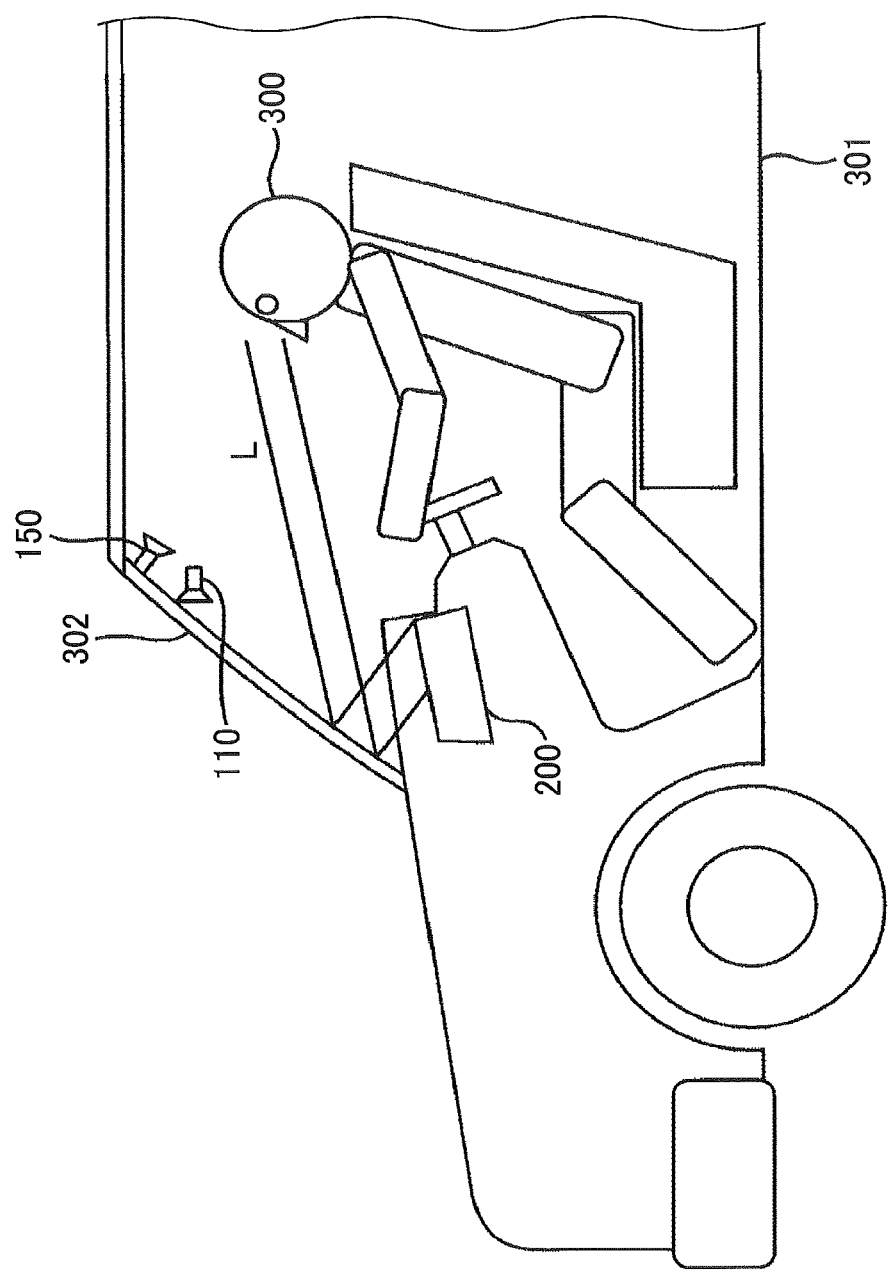
FIG. 2 is a partially-cutaway schematic side view schematically illustrating an inner arrangement of an automobile in which the HUD 200 according to the embodiment of the present invention is installed.
Figure 3:
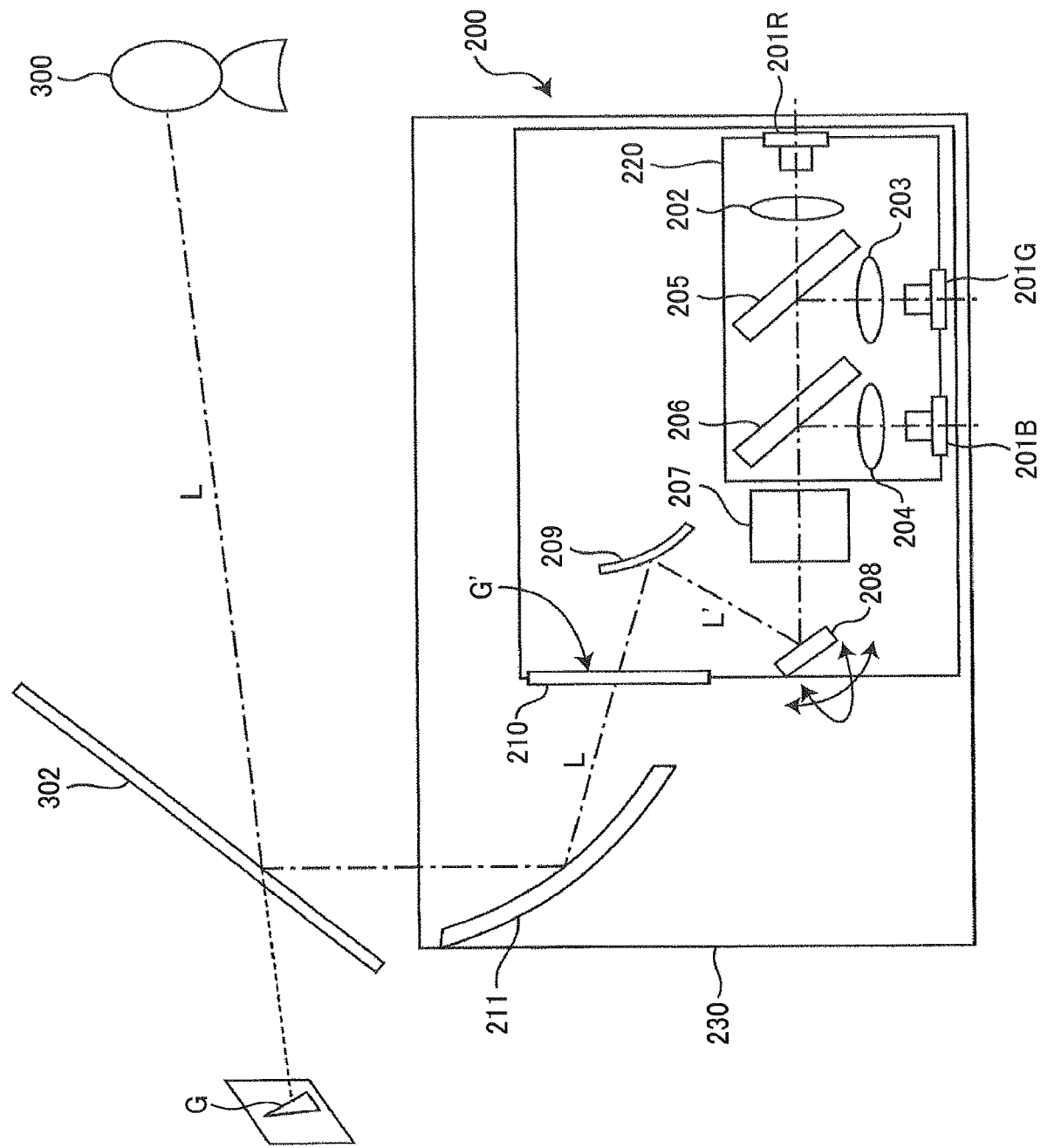
FIG. 3 is a block diagram schematically illustrating a configuration example of an optical system 230 of the HUD 200 of FIG. 2.

FIG. 1 is a forward view illustrating one example of a virtual image displayed by an automotive HUD 200 (hereinafter, simply referred to as a HUD 200) according to the embodiment of the present invention in a state where the virtual image is superposed on a landscape, which a driver can see through a windshield 302, in front of a vehicle 301. FIG. 2 is a partially-cutaway schematic side view schematically illustrating an inner arrangement of an automobile in which the HUD 200 according to the embodiment of the present invention is installed. FIG. 3 is a block diagram schematically illustrating a configuration example of an optical system of the HUD 200 of FIG. 2. The HUD 200 is one example of an image display apparatus.

In FIG. 2, the HUD 200 according to the embodiment of the present invention is installed, for example, inside a dashboard of the vehicle 301 that is a traveling body as a mobile body. Projected light L that is image light emitted by the HUD 200 inside the dashboard is reflected by the windshield 302 that is a light transmissive member, and the driver 300 who is a viewer is irradiated with the projected light L. Thus, the driver 300 can see a route navigation image or the like described later as the virtual image G. It is also possible that a combiner is installed as a light transmissive member on the inner wall of the windshield 302, and the projected light L reflected by the combiner allows the driver 300 to see the virtual image G.

At an upper portion of the windshield 302, a forward shooting camera 110 and a driver camera 150 are arranged. The forward shooting camera 110 takes a picture of a forward view. The forward view a picture of which is taken by the forward shooting camera 110 includes display information displayed by the HUD 200 onto the windshield 302 and a background of the display information. That is, the forward shooting camera 110 takes a picture of the display information displayed by the HUD 200 onto the windshield 302 and a picture of the background through the windshield 302. The background a picture of which is taken by the forward shooting camera 110 through the windshield 302 includes an environment in front of the vehicle 301 (i.e., a preceding vehicle, a road surface, and so forth). The driver camera 150 takes a picture of the driver 300 for detecting the visual point position of the driver 300.

According to the embodiment of the present invention, the optical system 230 of the HUD 200 and so forth are designed in such a manner that the distance from the driver 300 to the virtual image G is greater than or equal to 5 m. In contrast, in a conventional common automotive HUD, a distance from a driver to a virtual image is approximately 2 m. Generally speaking, a driver carefully watches a forward infinite point of the vehicle, or carefully watches a preceding vehicle at several tens of meters. In a case where the driver who has focused on such a distant position will see a virtual image at 2 m, the focal length varies greatly. As a result, the driver greatly moves the lenses of the eyes. Thus, a focus adjustment time taken until the virtual image is focused increases, a time is taken for the driver to recognize the contents of the virtual image, and the driver's eyeballs may become easily tired. Further, it is not easy for the driver to notice the contents of the virtual image, and it may be difficult to appropriately provide information to the driver with the virtual image.

In contrast, because the distance to the virtual image G is greater than or equal to 5 m in the embodiment of the present invention, an amount by which the driver 300 moves the lenses of the eyes is reduced from the amount of the conventional case, and the focus adjustment time taken until the virtual image G is focused is reduced so that the driver can rapidly recognize the contents of the virtual image G. Further, it is possible to reduce tiredness of the eyeballs of the driver 300. Further, the driver 300 can easily notice the contents of the virtual image G, and it is possible to appropriately provide information to the driver 300 with the virtual image G easily. In a case where the distance up to the virtual image G is greater than or equal to 5 m, the driver 300 can focus on the virtual image G almost without performing convergence movement of the eyeballs. Accordingly, it is possible to suppress a reduction in an advantageous effect to allow a viewer to perceive a sense of distance (a change in the perceivable distance) and a sense of depth (a difference in the perceivable distance) with the use of motion parallax, the reduction otherwise occurring due to the eyeballs' convergence movement. Thus, it is possible to effectively obtain an advantageous effect for the driver 300 to perceive information with the use of the sense of distance and the sense of depth.

The optical system 230 of the HUD 200 illustrated in FIG. 3 includes red, green, and blue laser light sources 201R, 201G, and 201B; collimator lenses 202, 203, and 204 for the respective laser light sources; and two dichroic mirrors 205 and 206. The optical system 230 further includes a light intensity adjustment section 207, an optical scanning apparatus 208 as an optical scanning section, a free-curved mirror 209, a micro-lens array 210 as a light divergence member, and a projection mirror 211 as a light reflecting member. Further, in a light source unit 220, the laser light sources 201R, 201G, and 201B, the collimator lenses 202, 203, and 204, and the dichroic mirrors 205 and 206 are integrated with an optical housing.

As the laser light sources 201R, 201G, and 201B, LDs (semiconductor laser devices) can be used. The wavelength of the beam emitted by the red laser light source 201R is, for example, 640 nm; the wavelength of the beam emitted by the green laser light source 201G is, for example, 530 nm; and the wavelength of the beam emitted by the blue laser light source 201B is, for example, 445 nm.

In the HUD 200 according to the embodiment of the present invention, an intermediate image formed on the micro-lens array 210 is projected onto the windshield 302 of the vehicle 301. Thus, the driver 300 is able to see a magnified image of the intermediate image as the virtual image G. The laser light of the corresponding color emitted from each of the laser light sources 201R, 201G, and 201B is transformed into approximately parallel light by the corresponding one of the collimator lenses 202, 203, and 204, and thereafter, is combined with the other two colors of laser light by the two dichroic mirrors 205 and 206. The light intensity adjustment section 207 adjusts the light intensity of the combined laser light, and thereafter the laser light is deflected by the mirror of the optical scanning apparatus 208 to scan the free-curved mirror 209 two-dimensionally. The scanning light L' that scans the free-curved mirror 209 two-dimensionally as a result of being deflected by the optical scanning apparatus 208 is reflected by the free-curved mirror 209 so that distortion is corrected, and thereafter is concentrated onto the micro-lens array 210 and renders the intermediate image G' on the micro-lens array 210.

Note that, according to the embodiment of the present invention, the micro-lens array 210 is used as the light divergence member to divergently emit the beams corresponding to the respective pixels of the intermediate image G' (the respective points of the intermediate image). However, it is possible to use another light divergence member. Further, it is also possible to use a liquid crystal display (LCD) or a fluorescent display tube (VFD) to form the intermediate image G'. However, the laser scanning type as in the embodiment of the present invention is desirable for displaying the large virtual image G with high brightness.

In this regard, if a liquid crystal display (LCD) or a fluorescent display tube (VFD) were used, non-image segments included in the display area to which the virtual image G is displayed would be irradiated even slightly, and it would be difficult to completely prevent the non-image segments from being irradiated. As a result, the visibility of the forward landscape of the vehicle 301 viewable through the non-image segments might degrade. In contrast, according to the laser scanning type as in the embodiment of the present invention, it is possible to completely prevent the non-image segments of the virtual image G in the display area from being irradiated by turning off the laser light sources 201R, 201G, and 201B. Thus, it is possible to avoid degradation of the visibility of the forward landscape of the vehicle 301 through the non-image segments otherwise being degraded due to light emitted from the HUD 200, and it is possible to further improve the visibility of the forward landscape.

Further, for a case where the HUD 200 gradually increases the brightness of an alarm image for, for example, alarming the driver, the HUD 200 performs a display control process to gradually increase the brightness of the alarm image from among various images included in the virtual image G. Also for the case of performing the display control process to increase the brightness of the partial image included in the virtual image G displayed by the HUD 200, the laser scanning type is desirable. If a liquid crystal display (LCD) or a fluorescent display tube (VFD) were used, also the brightness of images other than the alarm image included in the virtual image displayed by the HUD 200 might be increased together. Thus, if a liquid crystal display (LCD) or a fluorescent display tube (VFD) were used, it might be impossible to increase the difference in the brightness between the alarm image and the other images, and thus, it might be impossible to sufficiently obtain the advantageous effect to increase the degree of alarming by gradually increasing the brightness of the alarm image.

The optical scanning apparatus 208 inclines the mirror in the main-scanning direction and in the sub-scanning direction with the use of a known actuator driving system such as a MEMS (Micro Electronic Mechanical Systems), to deflect the laser light that is incident on the mirror to two-dimensionally scan (raster scan) the free-curved mirror 209. Controlling the driving of the mirror is in synchronization with the light emission timing of the laser light sources 201R, 201G, and 201B. Note that the optical scanning apparatus 208 is not limited to having the above-described configuration. For example, an optical scanning apparatus using a mirror system including two mirrors that are oscillated or rotated about two mutually orthogonal axes may be used instead.

Figure 4:
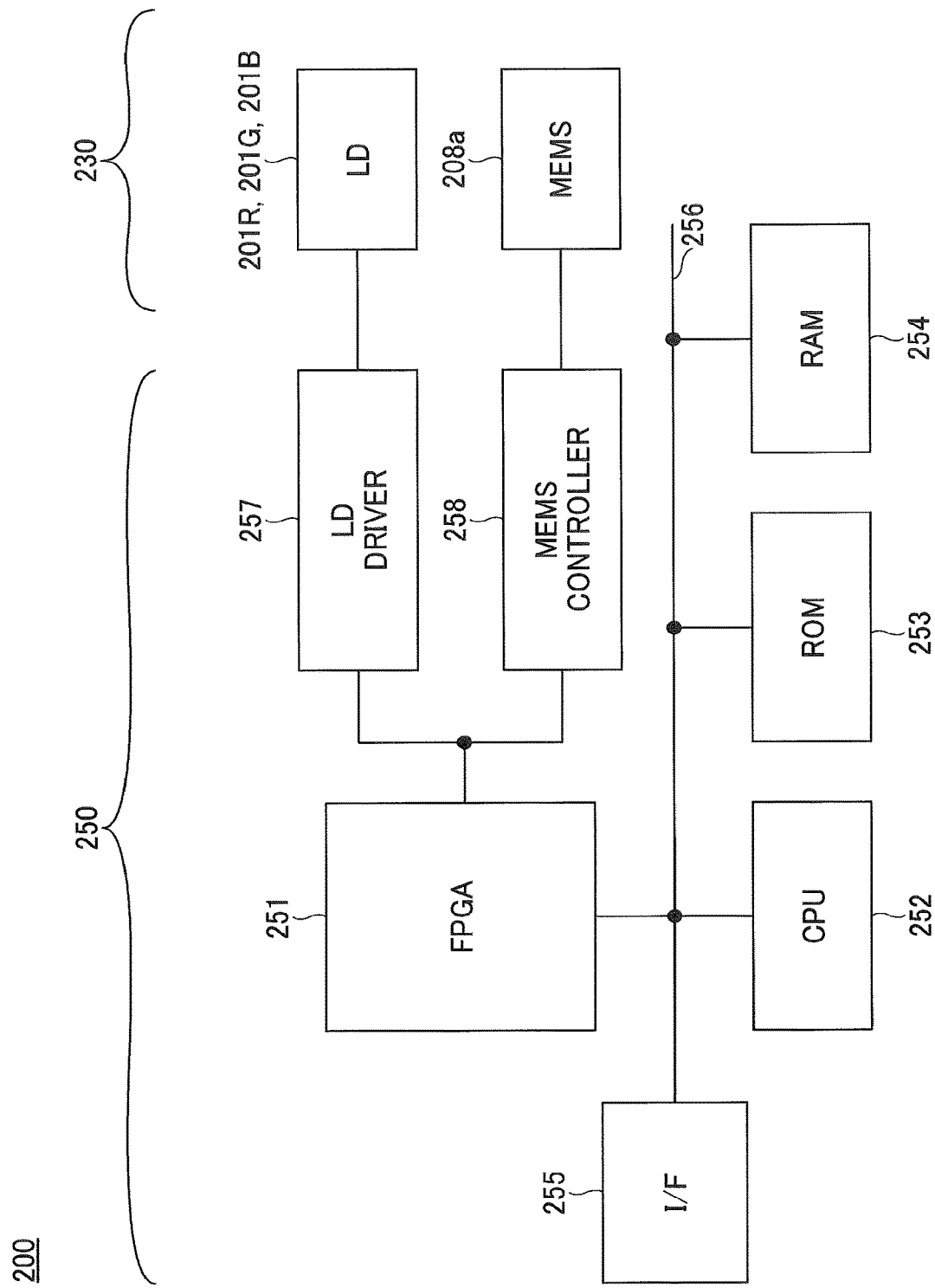
FIG. 4 is a block diagram illustrating a configuration example of a control system 250 of the HUD 200 of FIG. 2.

FIG. 4 is a block diagram illustrating a configuration example of the control system 250 of the HUD 200 of FIG. 2. As illustrated in FIG. 4, the control system 250 of the HUD 200 includes a FPGA (Field Programmable Gate Array) 251, a CPU (Central Processing Unit) 252, a ROM (Read-Only Memory) 253, a RAM (Random Access Memory) 254, an interface (hereinafter, referred to as I/F) 255, a bus line 256, a LD driver 257, and a MEMS controller 258. The FPGA 251 uses the LD driver 257 to control the laser light sources 201R, 201G, and 201B of the light source unit 220, and uses the MEMS controller 258 to control the MEMS 208a of the optical scanning apparatus 208. The CPU 252 implements various functions of the HUD 200. The ROM 253 stores various programs such as an image processing program for the CPU 252 to implement the various functions of the HUD 200. The RAM 254 is used as a work area of the CPU 252. The I/F 255 is an interface for communication with an external controller or the like, and is connected with, for example, a vehicle navigation apparatus 400, a various-sensor apparatus 500, and so forth via a CAN (Controller Area Network) of the vehicle 301.

To the I/F 255, also the forward shooting camera 110 is connected. The forward shooting camera 110 takes a picture of a forward view of the vehicle 301, i.e., the forward shooting camera 110 takes a picture of the display information displayed by the HUD 200 on the windshield 302, and takes a picture of the background of the display information through the windshield 302. Further, to the I/F 255, also the driver camera 150 is connected. The driver camera 150 is used to detect the visual point position of the driver 300. The control system 250 performs image processing on the pictures of the display information and the background to convert the pictures into a picture that would be obtained if the display information and the background were viewed from the visual point position of the driver 300 on the basis of the detected visual point position of the driver 300. The control system 250 detects the visual point position of the driver 300 by, for example, performing image analysis on the picture of the head of the driver 300 taken by the driver camera 150.

Figure 5:
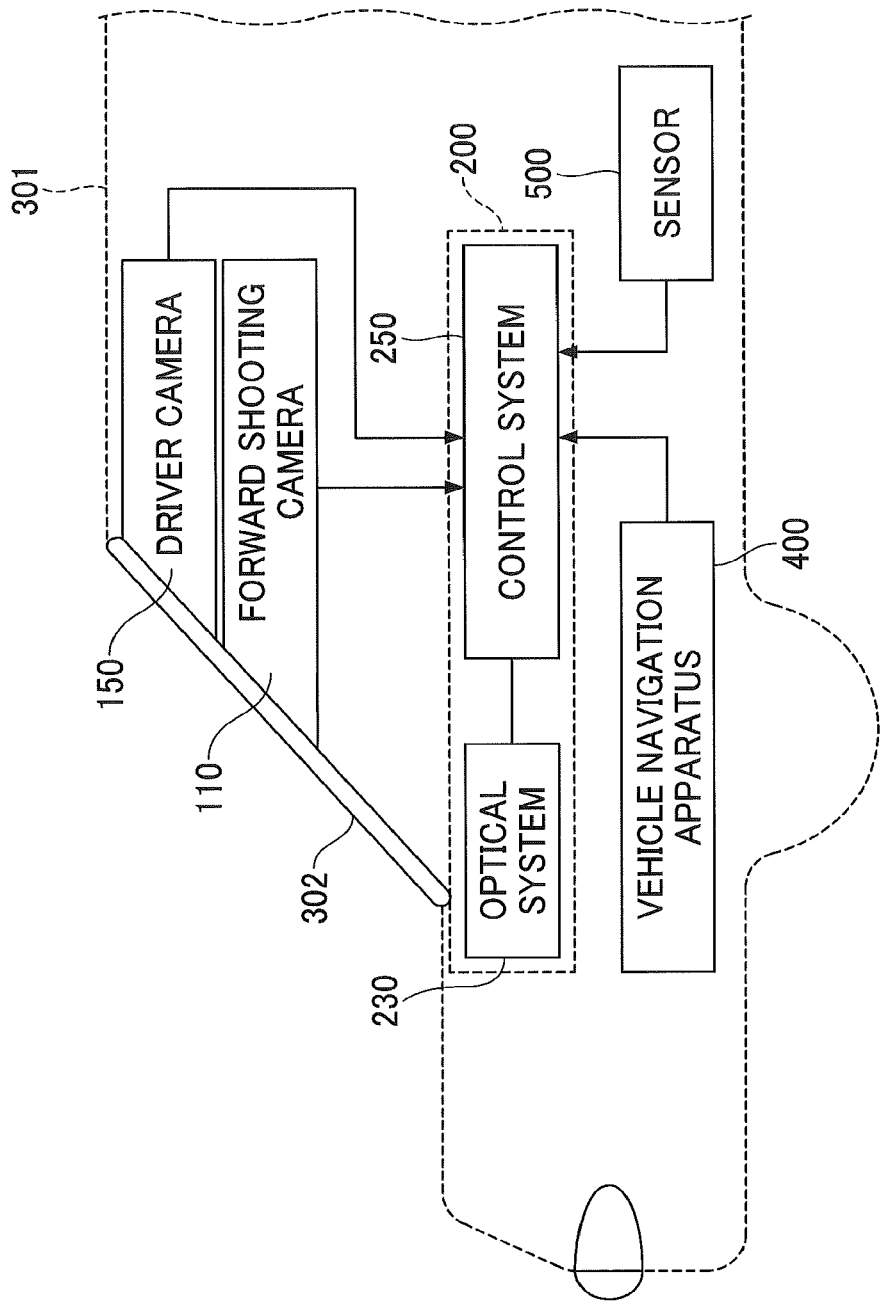
FIG. 5 is a block diagram illustrating a general arrangement example of peripheral apparatuses of the HUD 200 of FIG. 2.

FIG. 5 is a block diagram illustrating a general arrangement of peripheral apparatuses of the HUD 200 of FIG. 2. In the embodiment of the present invention, as information obtaining sections that obtain driver-provided information to be provided to the driver 300 with the virtual image G, the vehicle navigation apparatus 400, the sensor apparatus, and so forth are installed. The HUD 200 mainly includes the optical system 230 that is one example of a display section and the control system 250 that is one example of a control section.

As the vehicle navigation apparatus 400 according to the embodiment of the present invention, a known vehicle navigation apparatus installed in an automobile or the like can be extensively used. The vehicle navigation apparatus 400 outputs information to generate a route navigation image to be displayed as the virtual image G; the information is input to the control system 250. The route navigation image includes, for example, as illustrated in FIG. 1, images that indicate the number of lanes (travelling lanes) of the road on which the vehicle 301 is traveling; the distance to the position at which the next course change (turning right, turning left, entering a branch route, or the like) will be performed; the direction in which the course change will be performed, and so forth. These types of information are input to the control system 250 from the vehicle navigation apparatus 400. As a result, under the control of the control system 250, the HUD 200 displays as the virtual image G the route navigation images such as a travelling lane image 711, a vehicular gap image 712, a course instruction image 721, a remaining distance image 722, an intersection (or the like) name image 723, and so forth in an upper image display area A.

Further, according to the image example illustrated in FIG. 1, the HUD 200 displays, as the virtual image G, images that indicate road-specific information (the road name, the speed limit, and so forth) in a lower image display area B. Also the road-specific information is input to the control system 250 from the vehicle navigation apparatus 400. As a result, under the control of the control system 250, the HUD 200 displays a road name image 701, a speed limit image 702, a no-passing indication image 703, and so forth corresponding to the road-specific information as the virtual image in the lower image display area B.

The sensor apparatus 500 of FIG. 5 includes one or more sensors for detecting various types of information that indicate the behavior of the vehicle 301, the state of the vehicle 301, the surrounding conditions of the vehicle 301, and so forth. From the sensor apparatus 500, sensing information to be used to generate images to be displayed as the virtual image G is output; the sensing information is input to the control system 250. For example, according to the image example illustrated in FIG. 1, the HUD 200 displays a vehicle speed image 704 (a character image "83 km/h" in the example of FIG. 1) that indicates the speed of the vehicle 301 in the lower image display area B. That is, vehicle speed information that is included in CAN information of the vehicle 301 is input to the control system 250 from the sensor apparatus 500; under the control of control system 250, the HUD 200 displays the character image indicating the vehicle speed in the lower image display area B as the virtual image G.

As the sensor apparatus 500, in addition to the sensor to detect the speed of the vehicle 301, (1) a laser radar apparatus or a photographing apparatus for detecting the distances to other vehicles, pedestrians, and constructions (guardrails, telegraph poles, and so forth) in the surroundings (forward, sideward, and backward) of the vehicle 301, and sensors for detecting the vehicle surrounding information (the ambient temperature, the lightness outside, the weather, and so forth); (2) sensors for detecting driving operations of the driver 300 (a braking operation, the accelerator position, and so forth); (3) a sensor for detecting the remaining fuel amount in the fuel tank of the vehicle 301; and (4) sensors for detecting states of various on-board apparatuses such as the engine, the battery, and so forth can be included for example. The information that indicates the detection results of the sensor apparatus 500 is sent to the control system 250 so that the HUD 200 can provide the information to the driver 300 in the form of the virtual image G.

Next, the virtual image G displayed by the HUD 200 will be described. In the HUD 200 according to the embodiment of the present invention, the driver-provided information to be provided to the driver 300 by the virtual image G can include any information as long as the information is useful for the driver 300. According to the embodiment of the present invention, for the sake of convenience, the driver-provided information to be provided to the driver is generally classified into passive information and active information.

The passive information is information that is passively recognized by the driver 300 at a time when predetermined information provision conditions are satisfied. Therefore, information that is provided to the driver 300 at a set time stored in the HUD 200 is included in the passive information. Information such that a time at which the information is provided has a fixed relationship with the contents of the information is included in the passive information. As the passive information, for example, information concerning safety while driving, route navigation information, and so forth can be cited. As the information concerning safety while driving, information (the vehicular gap image 712) that indicates the vehicular gap between the vehicle 301 and the preceding vehicle, emergency information concerning driving (alarm information such as emergency operation instruction information that gives instruction to the driver to perform an emergency operation; attention attracting information; or the like), and so forth can be cited. The route navigation information is information of route guidance for a predetermined destination, and can be the same as information that is provided to a driver by a known vehicle navigation apparatus. As the route navigation information, travelling lane instruction information (the travelling lane image 711) for giving instruction for the travelling lane to travel at an immediate intersection; course change instruction information for giving an instruction for a course change operation at the intersection or the branch point of a next course change from the straight-ahead direction; and so forth can be cited. As the course change instruction information, course instruction information (the course instruction image 721) to give an instruction for a course to select at the intersection or the branch point; information (the remaining distance image 722) indicating the remaining distance up to the intersection or the like of the course change; information (the intersection (or the like) name image 723) indicating the name of the intersection or the like; and so forth can be cited.

The active information is information to be actively recognized by the driver 300 at a time that is determined by the driver 300 himself or herself. The active information is such that it is sufficient for the active information to be provided to the driver 300 at a time desired by the driver 300. For example, information such that a time at which the information is provided has little or no relationship with the contents of the information is included in the active information. The active information is information that is provided at a time desired by the driver 300, and therefore, is information that is displayed continuously for a rather long time or is displayed continuously at all times. For example, the road-specific information for the road on which the vehicle 301 is traveling, the vehicle speed information (the vehicle speed image 704) of the vehicle 301, the current time information, and so forth can be cited. As the road-specific information, information concerning the road and useful for the driver 300 such as information (the road name image 701) indicating the name of the road; information (the speed limit image 702 or the no-passing indication image 703) indicating regulation contents concerning the road; and so forth can be cited for example.

According to the embodiment of the present invention, the thus generally classified passive information and active information are displayed in the respective display areas where the virtual images G can be displayed. Actually, according to the embodiment of the present invention, as areas in which the HUD 200 displays the virtual images, two display areas arranged vertically are set. In the upper image display area A of these two display areas, mainly passive information images corresponding to the passive information are displayed. In the lower image display area B of these two display areas, mainly active information images corresponding to the active information are displayed. Note that, for a case where some of the active information images are displayed in the upper image display area A, these active information images are displayed in such a manner that the visibility of the passive information images displayed in the upper image display area A has priority over the visibility of these active information images.

Further, according to the embodiment of the present invention, as the virtual image G displayed by the HUD 200, a stereoscopic image that is expressed with the use of a stereoscopic approach is used. Actually, as the vehicular gap image 712 and the travelling lane image 711 displayed in the upper image display area A in which the virtual image is displayed by the HUD 200, a perspective image that is expressed with the use of perspective is used.

In more detail, the five horizontal lines included in the vehicular gap image 712 are displayed in such a manner that the higher horizontal line is shorter. Thus, the vehicular gap image 712 is expressed as a perspective image directed toward a single vanishing point according to a perspective drawing method. Especially, according to the embodiment of the present invention, the vehicular gap image 712 is formed in such a manner that the vanishing point can be determined near the gazing point of the driver 300. As a result, the driver 300 can easily perceive the sense of depth of the vehicular gap image 712. In addition, according to the embodiment of the present invention, the vehicular gap image 712 as the perspective image is displayed in such a manner that the higher horizontal line is narrower or the brightness of the higher horizontal line is lower. As a result, the driver 300 can further easily perceive the sense of depth of the vehicular gap image 712.

Figure 6A:
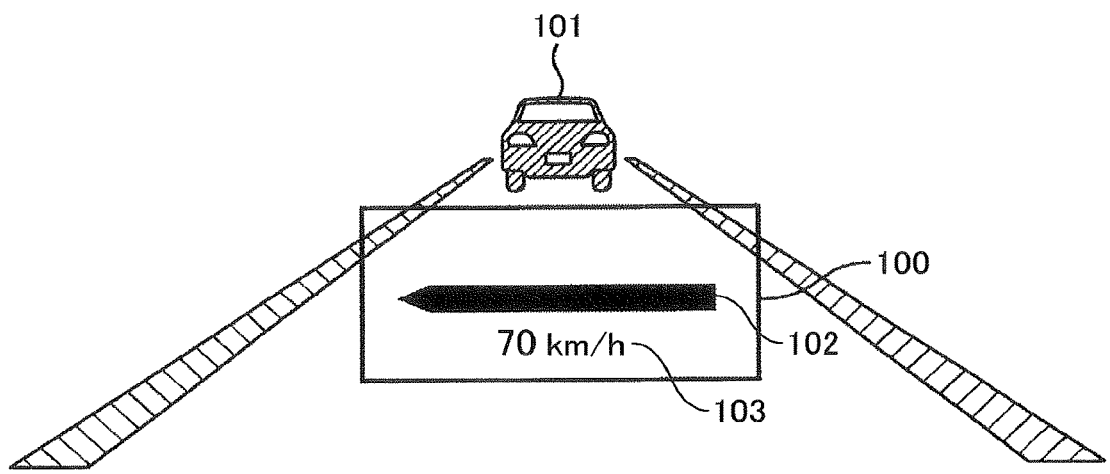
FIG. 6A is a first front view illustrating a displaying example of the HUD 200 viewed from the visual point of a driver 300 together with an environment in front of the vehicle 301.
Figure 6B:
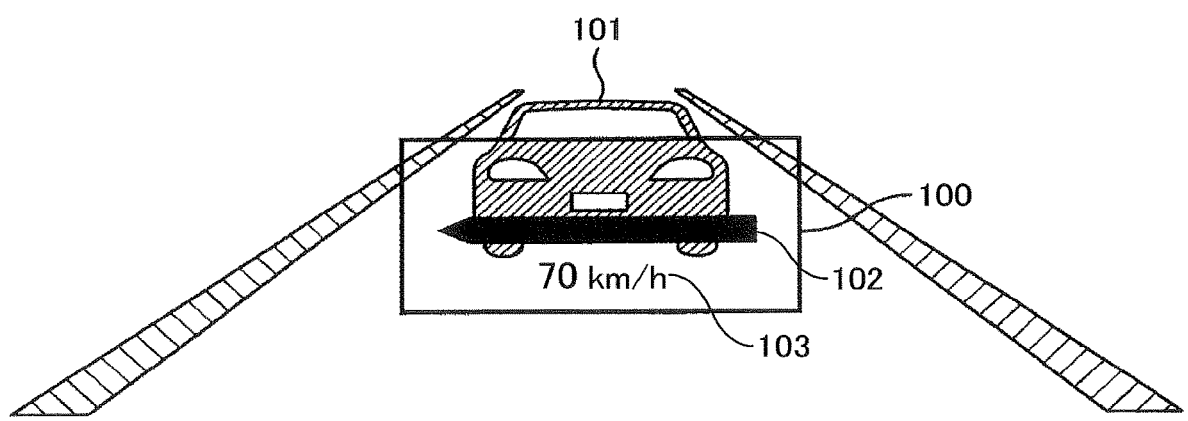
FIG. 6B is a second front view illustrating a displaying example of the HUD 200 viewed from the visual point of the driver 300 together with an environment in front of the vehicle 301.

FIGS. 6A and 6B are front views each illustrating an example displayed by the HUD 200 viewed from the visual point of the driver 300 together with a forward environment of the vehicle 301. As described above, being viewed from the visual point of the driver (movable in the left and right directions, in the forward and backward directions, and in the vertical directions of the vehicle 301), the image display area 100 in which the HUD 200 displays the virtual image overlaps with the road surface on which the vehicle 301 is travelling. In this regard, depending on the position of the preceding vehicle 101, as illustrated in FIG. 6B, the image display area 100 may overlap with the preceding vehicle 101. In this case, the visibility of the image displayed in the image display area 100 and the visibility of the preceding vehicle 101 may greatly degrade.

FIG. 7 is a flowchart illustrating one example of an image display change process implemented by the control system 250 of FIG. 4. The embodiment of the present invention has the following three control modes (1), (2), and (3) for controlling an image for a case where, if the image displayed by the HUD 200 in the image display area 100 and the preceding vehicle 101 were viewed by the driver 300, the image would overlap with the preceding vehicle 101.

(1) Partial Erasing Mode

The partial erasing mode is a control mode such that a part of the image displayed in the image display area 100 is erased.

(2) Image Display Value Control Mode

The image display value control mode is a control mode such that display values (i.e., at least one type of values out of three types of values, i.e., brightness; hues that are, for example, ratios among R (red) values, G (green) values, and B (blue) values; and alpha values) of the entirety or a part of the image displayed in the image display area 100 are changed.

(3) Image Position Change Mode

The image position change mode is a control mode such that the position of the image displayed in the image display area 100 is changed.

Note that the alpha values are display values representing transparency of the displayed image.

In step S1 of FIG. 7, the control system 250 obtains a picture of the preceding vehicle 101 as a result of causing the forward shooting camera 110 to take a picture of a forward environment of the vehicle 301. Next, in step S2, the control system 250 obtains the visual point position of the driver 300 as a result of causing the driver camera 150 to take a picture of the head of the driver 300. Then, in step S3, the control system 250 causes the HUD 200 to display the display information. Next, in step S4, the control system 250 determines whether, if the display information image displayed by the HUD 200 and the preceding vehicle 101 were viewed from the driver's visual point position, the display information image would overlap with the preceding vehicle 101.

In detail, in step S4, the control system 250 performs image processing on the pictures that include the picture of the display information displayed on the windshield 302 by the HUD 200 and taken by the forward shooting camera 110 in step S3 and the picture of the preceding vehicle 101 taken by the forward shooting camera 110 in step S1, on the basis of the visual point position of the driver 300 obtained in step S2. Through the image processing, the control system 250 converts the pictures that include the display information image displayed on the windshield 302 and the background of the display information image viewed through the windshield 302 into a picture that would be obtained from the visual point position of the driver 300. As a result, the control system 250 can determine whether, if the display information image and the preceding vehicle 101 were viewed from the driver's visual point position, the display information image would overlap with the preceding vehicle 101. Note that, for the sake of convenience of explanation, the preceding vehicle 101 is assumed as an object for which it is determined whether the object would overlap with the image displayed by the HUD 200 on the windshield 302. However, the object is not limited to the preceding vehicle 101. The object may be, instead of the "preceding vehicle 101", any object that adversely affects the visibility of the driver 300 because of overlapping with the image displayed by the HUD 200 on the windshield 302, where said any object may be the preceding vehicle 101.

An actual method to obtain the picture that would be obtained from the visual point position of the driver 300 may be, for example, the following method. That is, assuming that the forward shooting camera 110 includes two cameras for example, the two cameras are used to take respective pictures of the preceding vehicle 101, and the position of the preceding vehicle 101 (with respect to the vehicle 301) is determined according to the triangulation method. Next, on the basis of the thus obtained position of the preceding vehicle 101 and the detected visual point position of the driver 300, the position of the preceding vehicle 101 on the windshield 302 if the preceding vehicle 101 were viewed from the visual point of the driver 300 is determined. Next, on the basis of the taken picture of the display information image displayed by the HUD 200 on the windshield 302, the reflection position and the reflection angle at which the display information image is reflected by the windshield 302 are determined. Because the positional relationship between the forward shooting camera 110 and the windshield 302 is known, it is possible to determine the reflection position and the reflection angle on the basis of the position of the display information image on the windshield 302. Next, on the basis of the reflection position and the reflection angle, the position in the HUD 200 from which the display information image is emitted is determined. Because the positional relationship between the HUD 200 and the windshield 302 is known, it is possible to determine the position in the HUD 200 from which the display information image is emitted on the basis of the reflection position and the reflection angle. Next, on the basis of the position in the HUD 200 from which the display information image is emitted, the position of the display information image on the windshield 302 if the display information image were viewed from the driver's visual point is determined. By thus determining the positional relationship between the preceding vehicle 101 and the display information image on the windshield 302 included in the picture that would be obtained if the preceding vehicle 101 and the display information image were viewed from the visual point of the driver 300, it is possible to obtain the picture that includes the preceding vehicle 101 and the display information image when viewed from the visual point of the driver 300.

In response to the determination result YES in step S4, the control system 250 proceeds to step S5. In response to the determination result NO in step S4, the control system 250 returns to step S1.

In step S5, the control system 250 determines whether the control system 250 is in the above-mentioned "partially erasing mode". In response to the determination result YES in step S5, the control system 250 proceeds to step S6. In response to the determination result NO in step S5, the control system 250 proceeds to step S7.

In step S6, the control system 250 partially erases the display information displayed by the HUD 200, and returns to step S1.

Next, in step S7, the control system 250 determines whether the control system 250 is in the above-mentioned "image display value control mode". In response to the determination result YES in step S7, the control system 250 proceeds to step S8. In response to the determination result NO in step S7, the control system 250 proceeds to step S9.

In step S8, the control system 250 changes the display values (i.e., at least one type of values out of three types of values, i.e., brightness; hues that are, for example, ratios among R (Red) values, G (Green) values, and B (Blue) values; and alpha values) of the image displayed by the HUD 200, and returns to step S1.

Next, in step S9, the control system 250 determines whether the control system 250 is in the above-mentioned "image position change mode". In response to the determination result YES in step S9, the control system 250 proceeds to step S10. In response to the determination result NO in step S9, the control system 250 returns to step S1.

In step S10, the control system 250 changes the position at which the HUD 200 displays the image, and returns to step S1.

According to the embodiment of the present invention, the display information displayed by the HUD 200 includes, for example, the following three types of display information.

Figure 8A:
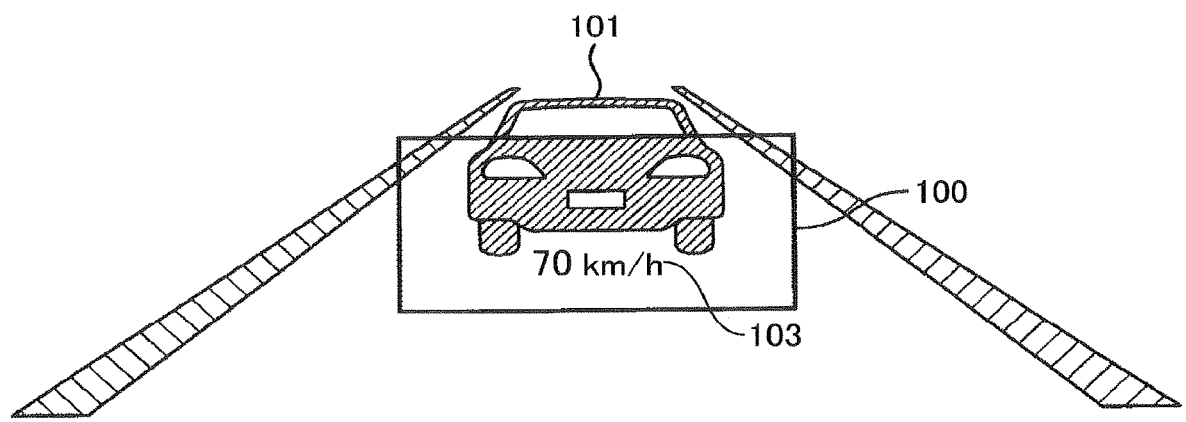
FIG. 8A is a third front view illustrating a displaying example of the HUD 200 viewed from the visual point of the driver 300 together with an environment in front of the vehicle 301.

(1) Speed display information
(2) Navigation display information (for example, "turn left 2 km ahead")
(3) Alarm display information of, for example, approaching a preceding vehicle FIG. 8A is a front view illustrating a displaying example of the HUD 200 viewed from the visual point of the driver 300 together with an environment in front of the vehicle 301. In the example of FIG. 8A, the partially erasing mode is used, and a part (for example, the navigation display information 102 (because of lower importance level) above the speed display information 103) is erased in the image display area 100.

Figure 8B:
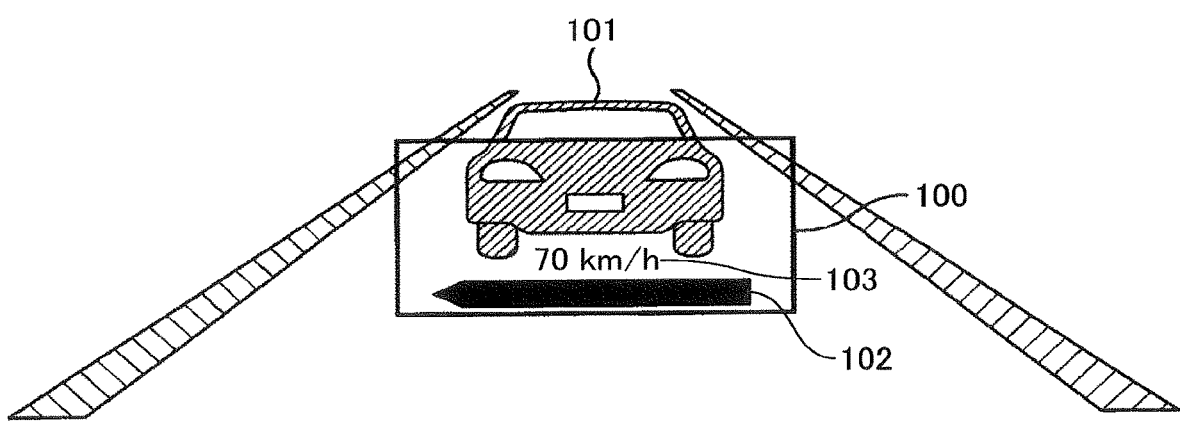
FIG. 8B is a fourth front view illustrating a displaying example of the HUD 200 viewed from the visual point of the driver 300 together with an environment in front of the vehicle 301.

FIG. 8B is a front view illustrating another displaying example of the HUD 200 viewed from the visual point of the driver 300 together with an environment in front of the vehicle 301. In the example of FIG. 8B, the image position change mode is used, and, in order to prevent the navigation display information 102 from overlapping with the preceding vehicle 101, the navigation display information 102 is shifted to below the speed display information 103. Note that, as illustrated in the example of FIG. 6A, originally, the navigation display information 102 is displayed above the speed display information 103.

Figure 9A:
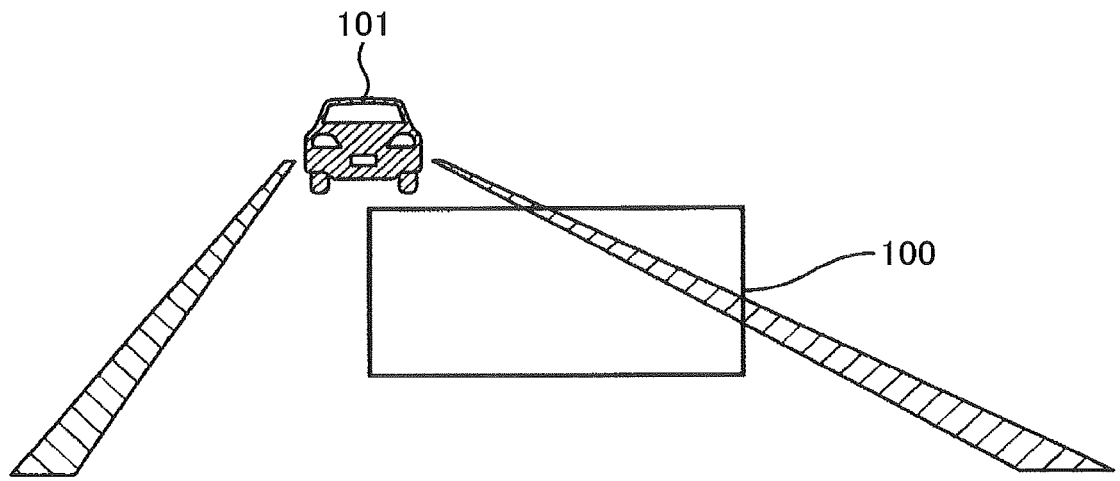
FIG. 9A is a fifth front view illustrating a displaying example of the HUD 200 viewed from the visual point of the driver 300 together with an environment in front of the vehicle 301.
Figure 9B:
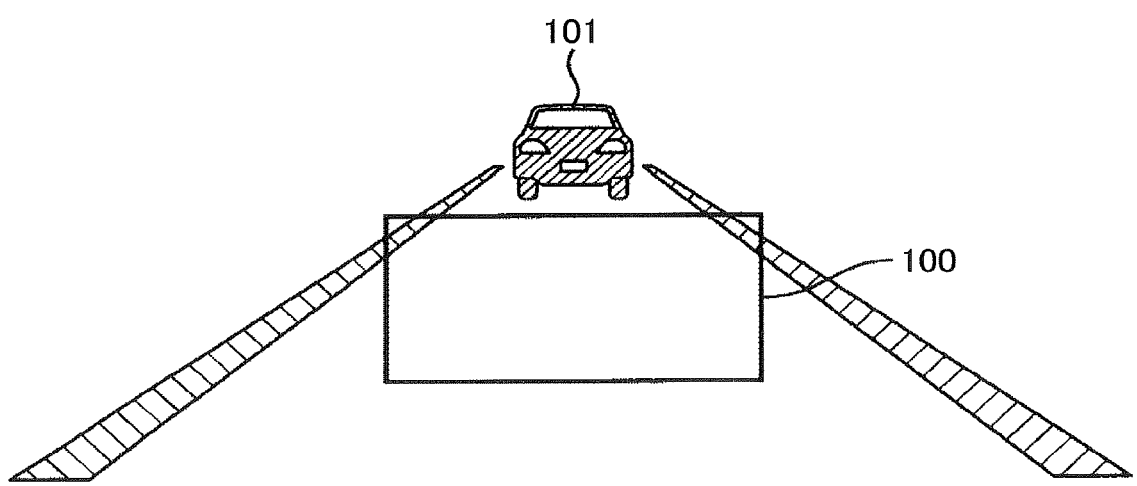
FIG. 9B is a sixth front view illustrating a displaying example performed by the HUD 200 viewed from the visual point of the driver 300 together with an environment in front of the vehicle 301.
Figure 9C:
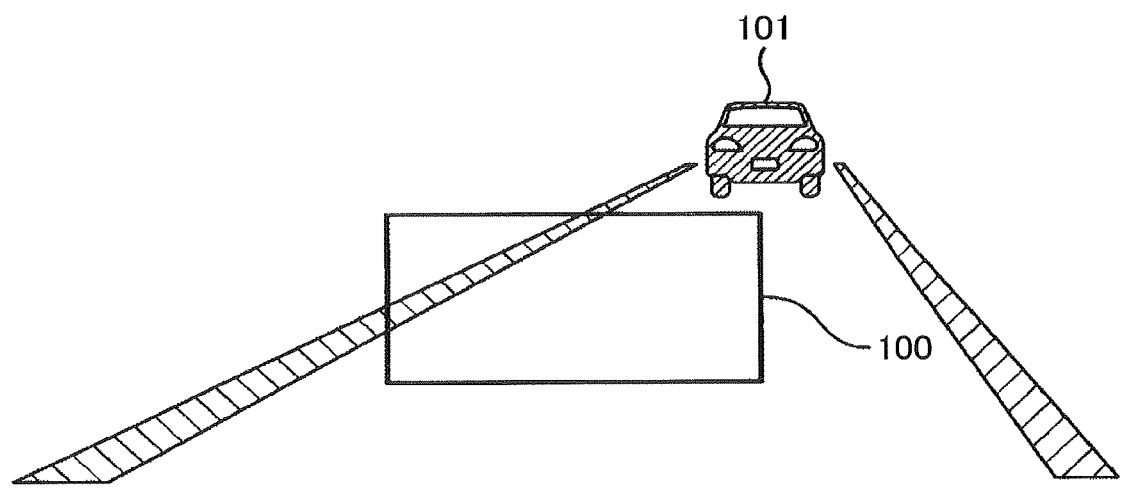
FIG. 9C is a seventh front view illustrating a displaying example of the HUD 200 viewed from the visual point of the driver 300 together with an environment in front of the vehicle 301.

FIGS. 9A, 9B, and 9C are yet other front views illustrating respective displaying examples of the HUD 200 viewed from the visual point of the driver 300 together with an environment in front of the vehicle 301.

The zone of the forward environment of the vehicle 301 included in the image display area 100 depends on the driver's visual point position. According to the example of FIG. 9B, when the preceding vehicle 101 is viewed from the visual point position of the driver 300, the preceding vehicle 101 is approximately at the center of the left and right directions with respect to the image display area 100. According to the example of FIG. 9A, when the preceding vehicle 101 is viewed from the visual point position of the driver 300, the preceding vehicle 101 is to the left with respect to the image display area 100. According to the example of FIG. 9C, when the preceding vehicle 101 is viewed from the visual point position of the driver 300, the preceding vehicle 101 is to the right with respect to the image display area 100.

Thus, to what degree an object such as the preceding vehicle 101 in the forward environment would overlap with the image display area 100 depends on the visual point position of the driver 300. Therefore, by taking into consideration the visual point position of the driver 300 when the control system 250 determines to what degree an object such as the preceding vehicle 101 in the forward environment would overlap with the image display area 100, it is possible to implement displaying the image in a state of further reducing obstructiveness.

Next, differences of the above-described embodiment of the present invention from the disclosed art of the patent document No. 1 will now be described.

According to the patent document No. 1, in order to provide a vehicular information display system that can display a large amount of information without interfering driver's visibility, transparency of an image is adjusted and a position to project the image is changed when the image overlaps with an object in front of a vehicle. However, by controlling only the transparency of the image and the position to project the image, it may be insufficient to implement improving the visibility, reducing a time for understanding information, avoiding misrecognition and annoyance, and so forth. Further, concerning a change in a driver's visual point position, the disclosed art of the patent document No. 1 may not have sufficient robustness against a change in a driving situation of a driver. According to the embodiment of the present invention, for a case where, if an image displayed on the windshield 302 and a forward object viewable through the windshield 302 were viewed from the driver, the image would overlap with the forward object, it is controlled whether to display the image on the windshield 302; the brightness, the hue, the transparency, or the position of the image is controlled; or the like, according to the degree at which the image would overlap with the forward object. As a result, it is possible to effectively improve the visibility of the image displayed on the windshield 302 and the visibility of the forward object viewable through the windshield 302.

In the above-described embodiment of the present invention, the automotive HUD 200 has been described. However, the present invention is not limited to the automotive HUD 200. The present invention can be applied also to HUDs for other vehicles, to HDDs for other uses, and to image display apparatuses such as displays. In these cases, a viewer corresponds to the driver 300, and an object at the same position as or near a position of an image display area 100 corresponds to the preceding vehicle 101 or the like.

In the above-described embodiment, the color information values are represented by the RGB values. However, instead, other color information values such as lightness coordinates may be used.

In the above-described embodiment, in the image display change process of FIG. 7, the partially erasing mode, the image display value control mode, and the image position change mode are used. However, the present invention is not limited to this manner; it is also possible that at least one of these control modes is used. It is also possible to use yet another manner to perform the image display change.

In the above-described embodiment of the present invention, it is determined whether, if the preceding vehicle 101 or the like and the image displayed on the windshield 302 were viewed from the visual point position of the viewer who is the driver 300, the preceding vehicle 101 or the like would overlap with the image. In this regard, a method for detecting the visual point position is not limited to the above-described method using the driver camera 150. It is also possible to detect the visual point position by detecting the position of the head of the viewer to determine the visual point position. Further, as to the visual point position, it is also possible to use a viewer's visual point position that is previously determined on the basis of design values of the optical system 230 at a time when the HUD 200 is installed, as illustrated in FIG. 3.

Thus, the image display apparatuses and the image display methods have been described with the embodiments. However, the present invention is not limited to the embodiments, and various modifications and improvements can be made within the scope of the present invention.

What is claimed is:

1. A head-up display apparatus comprising:
    an optical system to display an image on a windshield or a combiner of a vehicle;
    a first camera configured to take a picture of an object viewable through the windshield or the combiner at the same position as or near a position of the displayed image, and to take a picture of the displayed image;
    a second camera configured to take a picture of a head of a driver; and
    at least one processor configured to:
        analyze the picture of the head of the driver taken by the second camera to detect a position of a visual point of the driver;
        convert the picture of the displayed image and the picture of the object taken by the first camera into a picture that would be obtained from the visual point of the driver on the basis of the detected position of the visual point of the driver to determine whether the displayed image would overlap with the object when viewed from the position of the visual point of the driver; and
        control the displayed image in response to determining overlap of the object with the displayed image when viewed from the position of the visual point of the driver.

2. A head-up display apparatus according to claim 1, wherein
    in response to determining overlap of the object with the image when viewed from the position of the visual point of the driver viewing the image, the at least one processor performs control to erase a part of display information included in the image.

3. A head-up display apparatus according to claim 2, wherein
    the display value includes at least one of brightness, hue, and an alpha value.

4. A head-up display apparatus according to claim 1, wherein
    in response to determining overlap of the object with the image when viewed from the position of the visual point of the driver viewing the image, the at least one processor performs control to change a display value of all or a part of the image.

5. A head-up display apparatus according to claim 1, wherein
    in response to determining overlap of the object with the image when viewed from the position of the visual point of the driver viewing the image, the at least one processor performs control to change a position to display the image.

6. The head-up display apparatus according to claim 1, wherein the at least one processor is furthered configured to:
    have three modes of, in response to determining overlap of the object with the image when viewed from the position of the visual point of the driver, (i) performing control to erase a part of display information included in the image, (ii) performing control to change a display value of all or a part of the image, and (iii) 20 performing control to change a position to display the image; and
    perform, in response to determining that the at least one processor is in any one of the three modes (i), (ii), and (iii), control of the determined mode.

7. A head-up display method that is implemented by a head-up display apparatus that includes an optical system to display an image on a windshield of a vehicle or a combiner, the method comprising:
    taking, by a first camera, a picture of an object viewable through the windshield of the vehicle or the combiner at the same position as or near the image;
    displaying an image by the optical system and taking, by the first camera, a picture of the displayed image;
    taking, by a second camera, a picture of a head of a driver;
    analyzing the picture of the head of the driver taken by the second camera to detect a position of a visual point of the driver;
    converting the picture of the displayed image and the picture of the object taken by the first camera into a picture that would be obtained from the visual point of the driver on the basis of the detected position of the visual point of the driver, to determine whether the displayed image would overlap with the object when viewed from the position of the visual point of the driver; and
    controlling, by at least one processor, the image in response to determining overlap of the object with the displayed image when viewed from the position of the visual point of the driver.

8. A head-up display method according to claim 7, wherein the controlling the image includes, in response to determining overlap of the object with the image when viewed from the position of the driver viewing the image, performing, by the at least one processor, any one of control to erase a part of display information included in the image, control to change a display value of all or a part of the image, and control to change a position to display the image.

9. A non-transitory computer readable medium including instructions which when executed by one or more processors cause a head-up display method to be performed that is implemented by a head-up display apparatus that includes an optical system to display an image on a windshield of a vehicle or a combiner, the method comprising:

taking, by a first camera, a picture of an object viewable through the windshield of the vehicle or the combiner at the same position as or near the image;

displaying an image by the optical system and taking, by the first camera, a picture of the displayed image;

taking, by a second camera, a picture of a head of a driver;

analyzing the picture of the head of the driver taken by the second camera to detect a position of a visual point of the driver;

converting the picture of the displayed image and the picture of the object taken by the first camera into a picture that would be obtained from the visual point of the driver on the basis of the detected position of the visual point of the driver, to determine whether the displayed image would overlap with the object when viewed from the position of the visual point of the driver; and controlling, by at least one processor, the image in response to determining overlap of the object with the displayed image when viewed from the position of the visual point of the driver.

* * * * *